United States Patent
Kim et al.

(10) Patent No.: US 10,896,239 B1
(45) Date of Patent: Jan. 19, 2021

(54) ADJUSTING QUALITY SCORES OF EXTERNAL PAGES BASED ON QUALITY OF ASSOCIATED CONTENT

(71) Applicant: Facebook, Inc., Menlo Park, CA (US)

(72) Inventors: Taedong Kim, Mountain View, CA (US); Zhiye Fei, San Francisco, CA (US); Tanmoy Chakraborty, San Mateo, CA (US); Lei Wang, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 423 days.

(21) Appl. No.: 15/910,001

(22) Filed: Mar. 1, 2018

(51) Int. Cl.
  *G06F 16/958* (2019.01)
  *H04L 29/08* (2006.01)
  *G06F 16/955* (2019.01)

(52) U.S. Cl.
  CPC ........ *G06F 16/958* (2019.01); *G06F 16/9558* (2019.01); *H04L 67/20* (2013.01)

(58) Field of Classification Search
  CPC ..... G06F 16/958; G06F 16/9558; H04L 67/20
  See application file for complete search history.

(56) References Cited

U.S. PATENT DOCUMENTS

| | | | | |
|---|---|---|---|---|
| 9,177,333 B2 * | 11/2015 | Sinyagin | ............ | G06Q 30/0277 |
| 9,727,644 B1 * | 8/2017 | Teng | ...................... | G06Q 50/01 |
| 10,198,480 B2 * | 2/2019 | Yang | ...................... | G06F 16/958 |
| 2006/0253345 A1 * | 11/2006 | Heber | .............. | G06Q 10/06395 |
| | | | | 705/26.1 |
| 2009/0282015 A1 * | 11/2009 | Gabrilovich | ........... | G06Q 30/02 |
| 2014/0086073 A1 * | 3/2014 | Baykal | ................ | H04L 41/5067 |
| | | | | 370/252 |
| 2015/0066954 A1 * | 3/2015 | Jones | ..................... | G06F 16/958 |
| | | | | 707/748 |
| 2015/0287057 A1 * | 10/2015 | Baughman | ............ | H04L 41/145 |
| | | | | 705/7.31 |
| 2015/0302093 A1 * | 10/2015 | Jacob | ..................... | G06F 40/14 |
| | | | | 707/708 |
| 2016/0103861 A1 * | 4/2016 | Jacob | ..................... | G06F 16/958 |
| | | | | 707/711 |
| 2016/0103913 A1 * | 4/2016 | Jacob | .................. | H04L 67/1097 |
| | | | | 707/709 |
| 2016/0277259 A1 * | 9/2016 | Qi | ......................... | H04L 43/045 |
| 2017/0270169 A1 * | 9/2017 | Xian | ..................... | G06F 16/951 |

* cited by examiner

*Primary Examiner* — Huawen A Peng
(74) *Attorney, Agent, or Firm* — Fenwick & West LLP

(57) ABSTRACT

An online system accesses a content item containing a link to an external landing page. When an opportunity to present content to a viewing user occurs, the system determines a quality metric for the content item. The system further determines, based on the attributes of the external page, a quality metric for the external page. The quality metric for the external page is adjusted based on the quality metric of the content item. The system computes a value score for the content item based on the quality metrics for the content item and the external page. The content item is ranked against other content items for presentation in the opportunity. Content items are selected by the system and sent for presentation to the viewing user.

18 Claims, 4 Drawing Sheets

ADJUSTING QUALITY SCORES OF EXTERNAL PAGES BASED ON QUALITY OF ASSOCIATED CONTENT

BACKGROUND

This disclosure relates generally to ranking and presentation of content to users of an online system, and more specifically to ranking content based on predicted quality of external pages linked to by the content and the quality of the content itself.

Users and enterprises may post content to online systems to be shared between other users of the online system, such as in posted content in a social networking system. It is valuable for an online system to promote content with which a viewing user is likely to interact through actions such as liking, sharing, commenting, and performing other types of user engagement. This likelihood to interact is determined according to multiple factors. For example, the online system might account for factors such as the connection between a viewing user and a posting user, the interests of the viewing user, the timestamp of the post, and others.

When opportunities to present content arise, the online system selects content for presentation at least in part according to the probability of user interaction with the content. This selection process may use a probability score determined from the probability of an interaction occurring and a value associated with the interaction itself. The value of interaction with content may be based at least in part on the quality of the content. In the case that content contains a link to an external landing page, the quality of the landing page may additionally influence the viewing user's experience of the content and therefore may be used to determine the value of the content.

However, in the case where poor quality content contains a link to an external landing page, it is unlikely that the online system will benefit from providing the poor quality content to users of the online system regardless of the quality of the external landing page. High quality landing pages can thus subsidize the value scores of content, thereby causing low quality content to be presented to viewing users and negatively impact the experience of the viewing user.

SUMMARY

An online system scores and ranks content posted by users of the online system for selection and subsequent delivery to other users of the system, where some of the posted content contains links to external landing pages. When computing the score for a particular content item, the online system computes a quality score for the content item itself and another quality score for a landing page linked to in the content item. The quality score for the landing page is then scaled by the quality score of the content item. To determine an overall score for the content item, the online system includes as components of the overall score the scaled landing page score and optionally also includes another term based on the quality score of the content item itself. The content items are then ranked in a selection process based on their overall scores.

In this way, the online system uses the quality of the content item and the quality of the landing page to subsidize or penalize an overall score for various content items during a selection process for presenting content to a user of the system. Moreover, the effect of the quality score of the landing page is reduced or enhanced by the quality score of the content item itself, so as to prevent a bad (e.g., irrelevant to the user) content item from being scored highly solely because it has a good quality landing page. In particular, content items with a low quality score receive a decreased subsidy or penalty from the landing page quality, while content items with a high quality score receive a full or increased subsidy or penalty from the landing page quality. This prevents poor quality content items containing links to high quality landing pages from achieving a high overall quality component and ranking highly in the selection process. For example, in the case that a content item is associated with a low quality score, the system determines a multiplier to decrease the weight of the quality score of the landing page. The value score of the content item is accordingly based primarily upon the quality score of the content item, and does not reflect an inaccurate high quality score due to subsidization by the landing page quality. In another example, in the case that a content item is associated with a high quality score, the system determines a multiplier to maintain or increase the weight of the quality score of the landing page. The value score of the content item is determined based on both the quality score of the content item and the quality score of the landing page.

In one embodiment, the quality score for a content item is determined by the online system using a machine learning model that predicts a quality score for each content item based on information about the content item. In the case that a content item contains a link to an external landing page, the online system additionally determines a quality score for the landing page using another machine learning model. The machine learning model for predicting the quality of the content item and the model for predicting the quality of a landing page may each be trained to predict a quality score, where each model is trained using professional raters that provide quality scores for example content items and landing pages. Alternatively, the models may be trained using user engagement as a proxy for quality, using examples of content items and landing pages that were previously delivered to users of the system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
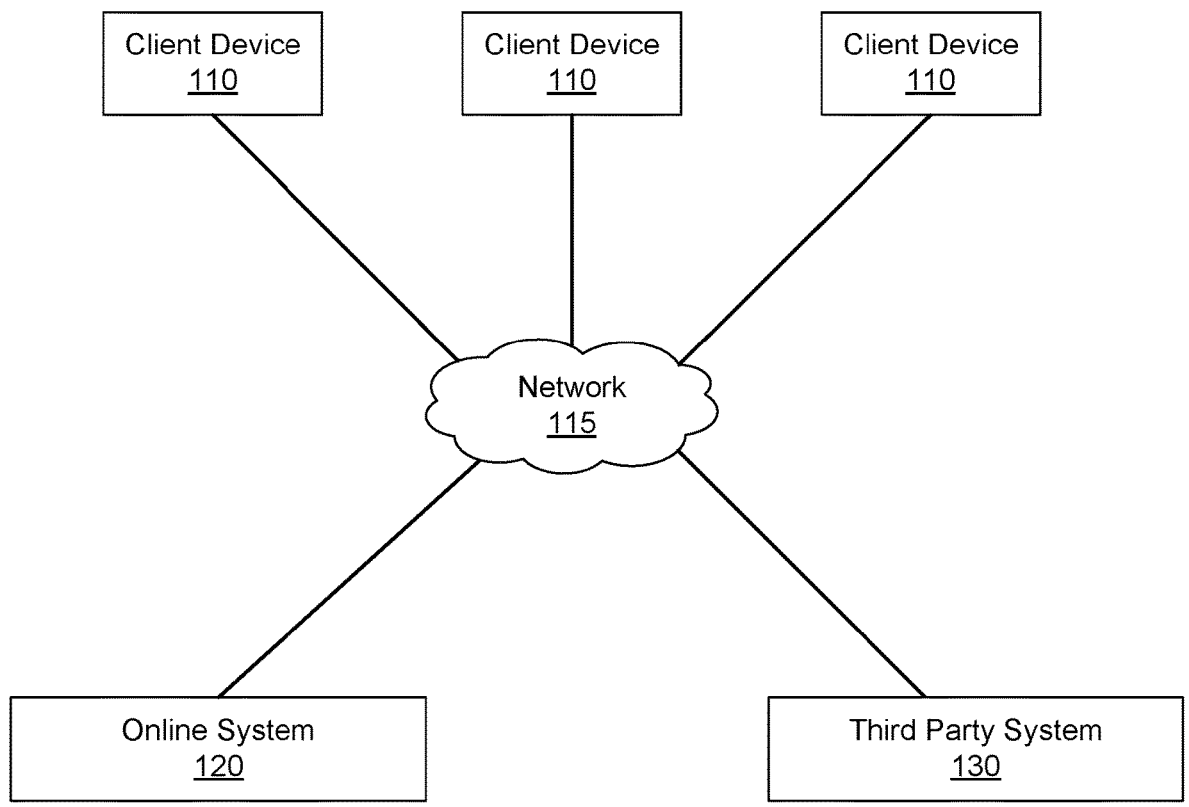
FIG. 1 is a block diagram of a system environment in which an online system operates, in accordance with an embodiment.

FIG. 1 is a block diagram of a system environment 100 for an online system 120. The system environment 100 shown by FIG. 1 comprises one or more client devices 110, a network 115, one or more third-party systems 130, and the online system 120. In alternative configurations, different and/or additional components may be included in the system environment 100. For example, the online system 120 is a social networking system, a content sharing network, or another system providing content to users.

The client devices 110 are one or more computing devices capable of receiving user input as well as transmitting and/or receiving data via the network 115. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 115. In one embodiment, a client device 110 executes an application allowing a user of the client device 110 to interact with the online system 120. For example, a client device 110 executes a browser application to enable interaction between the client device 110 and the online system 120 via the network 115. In another embodiment, a client device 110 interacts with the online system 120 through an application programming interface (API) running on a native operating system of the client device 110, such as IOS® or ANDROID™.

The client devices 110 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

One or more third party systems 130 may be coupled to the network 115 for communicating with the online system 120, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 120, such as advertisements, content, or information about an application provided by the third party system 130.

Figure 2:
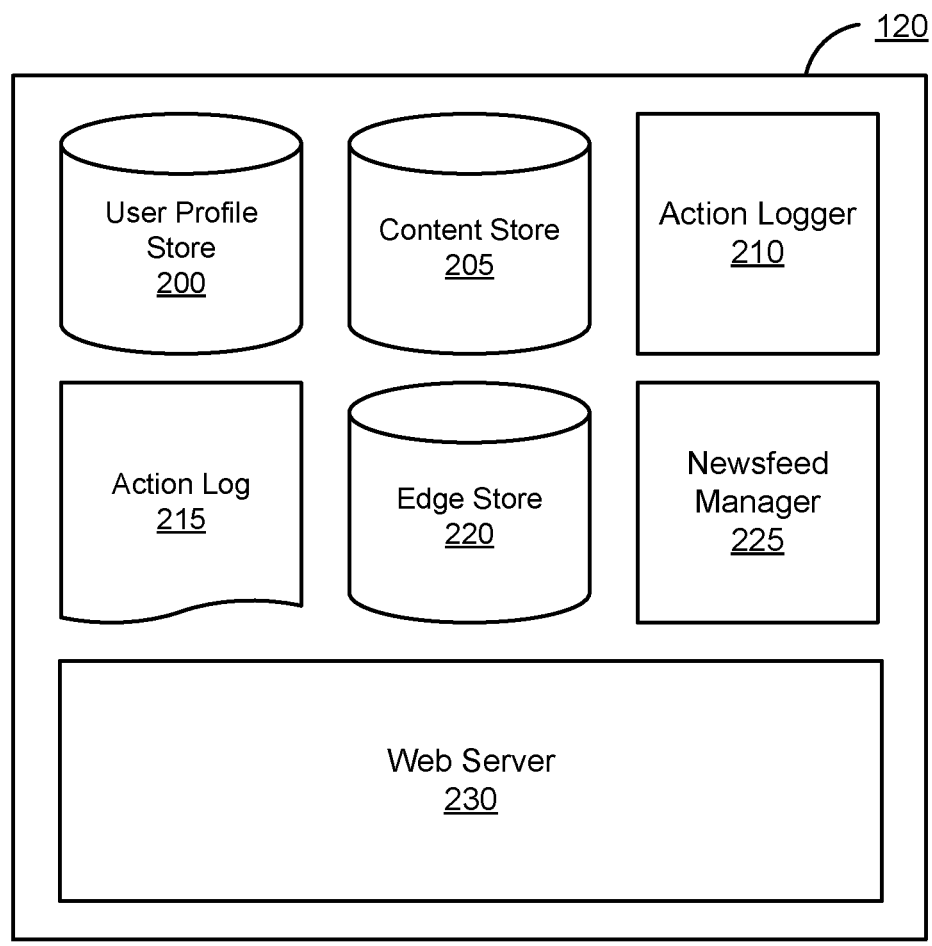
FIG. 2 is a block diagram of an architecture of the online system, in accordance with an embodiment.

FIG. 2 is a block diagram of an architecture of the online system 120. The online system 120 shown in FIG. 2 includes a user profile store 200, a content store 205, an action logger 210, an action log 215, an edge store 220, a newsfeed manager 225, and a web server 230. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 200. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action log 215.

While user profiles in the user profile store 200 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 205 stores objects that each represent various types of content items. Examples of content items include a page post, a status update, a photograph, a video, a link, a shared content item, a sponsored content item (e.g., an advertisement), a gaming application achievement, a check-in event at a local business, a brand page, or any other type of content. The content may be posted to the online system 120 by users of the system, administrators of pages on the system 12, or other third parties, and the content items may be provided to the system 120, directly or indirectly via third parties, using a web page or native application interface or using APIs. Online system users may create objects stored by the content store 205, such as status updates, photos tagged by users to be associated with other objects in the online system 120, events, groups or applications. In some embodiments, objects are received from third-party applications or third-party applications separate from the online system 120. In one embodiment, objects in the content store 205 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

One or more content items included in the content store 205 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 120 if content in the content item is presented to a user, if the content in the content item receives a user interaction when presented, or if any suitable condition is satisfied when content in the content item is presented to a user. For example, the bid amount included in a content item specifies a monetary amount that the online system 120 receives from a user who provided the content item to the online system 120 if content in the content item is displayed. In some embodiments, the expected value to the online system 120 of presenting the content from the content item may be determined by multiplying the bid amount by a probability of the content of the content item being accessed by a user.

In various embodiments, a content item includes various components capable of being identified and retrieved by the online system 120. Example components of a content item include: a title, text data, image data, audio data, video data, a landing page, a user associated with the content item, or any other suitable information. The online system 120 may retrieve one or more specific components of a content item for presentation in some embodiments. For example, the online system 120 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 120 logs interactions between users presented with the content item or with objects associated with the content item. Additionally, the online system 120 receives compensation from a user associated with content item as online system users perform interactions with a content item that satisfy the objective included in the content item.

Additionally, a content item may include one or more targeting criteria specified by the user who provided the content item to the online system 120. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 120. Targeting criteria may also specify interactions between a user and objects performed external to the online system 120, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 210 receives communications about user actions internal to and/or external to the online system 120, populating the action log 215 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 215.

The action log 215 may be used by the online system 120 to track user actions on the online system 120, as well as actions on third party systems 130 that communicate information to the online system 120. Users may interact with various objects on the online system 120, and information describing these interactions is stored in the action log 215. Examples of interactions with objects include: commenting on posts, sharing links, checking in to physical locations via a client device 110, accessing content items, and any other suitable interactions. Additional examples of interactions with objects on the online system 120 that are included in the action log 215 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 215 may record a user's interactions with advertisements on the online system 120 as well as with other applications operating on the online system 120. In some embodiments, data from the action log 215 is used to infer interests or preferences of a user, augmenting the interests included in the user's user profile and allowing a more complete understanding of user preferences.

The action log 215 may also store user actions taken on a third party system 130, such as an external website, and communicated to the online system 120. For example, an e-commerce website may recognize a user of an online system 120 through a social plug-in enabling the e-commerce website to identify the user of the online system 120. Because users of the online system 120 are uniquely identifiable, e-commerce websites, such as in the preceding example, may communicate information about a user's actions outside of the online system 120 to the online system 120 for association with the user. Hence, the action log 215 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 210 by the application for recordation and association with the user in the action log 215.

In one embodiment, the edge store 220 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 200, or the user profile store 200 may access the edge store 220 to determine connections between users.

In one embodiment, the online system 120 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 225 may generate stories for presentation to a user based on information in the action log 215 and in the edge store 220 or may select candidate stories included in the content store 205. One or more of the candidate stories are selected and presented to a user by the newsfeed manager 225.

For example, the newsfeed manager 225 receives a request to present one or more stories to an online system user. The newsfeed manager 225 accesses one or more of the user profile store 200, the content store 205, the action log 215, and the edge store 220 to retrieve information about the identified user. For example, stories or other data associated with users connected to the identified user are retrieved. The retrieved stories or other data are analyzed by the newsfeed manager 225 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 225 selects one or more of the candidate stories for presentation to the identified user.

In various embodiments, the newsfeed manager 225 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 200. The newsfeed manager 225 may also determine the order in which selected stories are presented via the newsfeed. For example, the newsfeed manager 225 determines that a user has a highest affinity for a specific user and increases the number of stories in the newsfeed associated with the specific user or modifies the positions in the newsfeed where stories associated with the specific user are presented.

The newsfeed manager 225 may also account for actions by a user indicating a preference for types of stories and selects stories having the same, or similar, types for inclusion in the newsfeed. Additionally, the newsfeed manager 225 may analyze stories received by the online system 120 from various users to obtain information about user preferences or actions from the analyzed stories. This information may be used to refine subsequent selection of stories for newsfeeds presented to various users.

The web server 230 links the online system 120 via the network 115 to the one or more client devices 110, as well as to the one or more third party systems 130. The web server 230 serves web pages, as well as other content, such as JAVA®, FLASH®, XML and so forth. The web server 230 may receive and route messages between the online system 120 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 205. Additionally, the web server 230 may provide application programming interface (API) functionality to send data directly to native client device operating systems, such as IOS®, ANDROID™, or BlackberryOS.

Adjusting Quality Scores of External Pages Based on Quality of Associated Posts When a user of an online system 120 accesses a page, the online system 120 identifies content items for presentation to the user through a selection process. Content items that compete for presentation may be items in a newsfeed, items in a content discovery user interface (UI), search results in response to a query, sponsored content, or any other UI in which the online system may present content to its users. The online system 120 ranks content items for users using a score associated with each content item and presents content items based on the ranking. For example, the online system 120 selects content items based on achieving a threshold content score. In another example, the online system 120 selects content items based on achieving a threshold position in the ranking.

The content item score used in the selection process ranking represents a probability that the viewing user will interact with the content item upon being presented with the content item (e.g., 'liking' the item, commenting on the item, sharing the item). The content item score may additionally be influenced by scores that are not associated with user action on the content item, such as professional raters' score predictions and bakeoff score predictions. The content item score includes a quality component that describes the quality of the content item. Other components may exist, such as monetary compensation to the online system 120 for sponsored content items.

The online system 120 uses a machine learning model to predict the quality component of the content item score. The model uses various factors associated with both the content item and the user for whom the selection process is being conducted to determine a quality score. For example, the online system 120 can use as inputs features about the content item itself, features about historical interactions by other users with the content item, features about the user to whom the content is being presented, features about the user's previous interactions with other content, and others. The online system 120 may further use as inputs the connection between a viewing user and a posting user, the interests of the viewing user, the timestamp associated with the content item, the targeted user demographic of the content item, and others. The machine learning model is then trained using example data. In one embodiment, the example data is taken from content items that have been rated by professional raters, such that the machine learned model is trained to predict the quality score that the professional raters would have assigned. In another embodiment, the machine learning model is trained using historical data about previously presented content items and whether users of the online system interacted with the content items. In this embodiment, the users' interactions are used as a proxy for quality.

When a content item contains an external link, the likelihood of user interaction with the content item is influenced by both the quality of the content item and the quality of the external landing page. The external link may include a URL to a web page, a deep link to a location within a mobile application, a link to an application store to install an application, or others. The corresponding external landing page may include a web page or a mobile application, such as a state or page in the mobile app defined by a deep link.

The online system 120 determines attributes of the external page to evaluate the quality of the external page. In one embodiment, the online system 120 uses features from the landing page associated with bad features such as a misleading title, slow load or technical glitch, not mobile friendly, advertisements, or others. Bad features are associated with a high likelihood of a viewing user closing out or navigating away from the landing page, and reflect negatively on the quality of the landing page and on the quality of the post on the online system 120. In another embodiment, the online system 120 additionally accounts for other features associated with the external landing page, including historical dwell time spent at the external link, the rate at which the viewing user navigates away from external pages historically, the average dwell time of the viewing user, and others as well as features extracted from the page. Based on the associated signals and features, the online system determines a quality score for the external page.

In one embodiment, the online system 120 also uses a machine learning model to predict the quality component of the landing page linked to in a content item. This machine learning model can include any of the features about the landing page discussed above for predicting its quality. The model can be trained similarly to the machine learning model for predicting the quality score of the content items themselves. In particular, the model may be trained using professional raters' quality ratings as the label, or the model may be trained using as labels whether users interacted with the landing pages when presented with a content item containing a link to the landing page. In other embodiments, combinations of user engagement and professional ratings are used to train the model.

For a content item where the content item quality score is low, it would not be beneficial for the online system 120 to display the content item to the viewing user. However, because the online system 120 evaluates the quality of the external page independently based on a number of factors associated with the features of the page itself, external pages can receive a high quality score regardless of the content item quality score. Additionally, external pages with a high quality score may subsidize the associated content items even when the content item itself is not scored highly for a viewing user (e.g., low relevance to user interests, low historical interaction with other users of the online system 120, and other factors). In one embodiment, the external page score is additively combined with the content item score. In this case, an adequately high external page score may sufficiently subsidize the overall bid quality modifier and cause a low quality content item to be presented to a viewing user.

$$\text{bid quality modifier} = \alpha_1(\text{content item score}) + \alpha_2(\text{external page score}) \quad \text{(Eq. 1)}$$

In the example shown in Equation 1, the bid quality modifier is determined by combining two independent quality scores (the content item score and the external page score), each with an associated multiplier $\alpha_1$ and $\alpha_2$. The multipliers $\alpha_1$ and $\alpha_2$ may be constants selected to weigh the impact of the content item score and the external page score on the bid quality modifier. For a content item containing an external link to a landing page wherein the content item score is low and the external page score is high, the bid quality modifier generated by Equation 1 may be unfairly subsidized by the external page score, causing the low quality content item to be selected for presentation.

To prevent low quality content items from being selected for presentation, the online system 120 instead generates a bid quality modifier by introducing a relationship in which the external page quality score is dependent on the content item score. For example, a content item with a high quality score is subsidized or penalized by the external landing page quality score. However, in another example, a content item with a low quality score is not subsidized or penalized by the external landing page quality score, as the low quality content item should not be selected for presentation regardless of the quality of the external landing page associated with it.

$$\text{bid quality modifier} = \alpha_1(\text{content item score}) + \alpha_2(\text{external page score}),$$

$$\text{where } \alpha_2 = f(\text{content item score}) \quad \text{(Eq. 2)}$$

In the example shown in Equation 2, the bid quality modifier is determined by combining the content item score and the external page score, each with an associated multiplier $\alpha_1$ and $\alpha_2$. The multiplier $\alpha_1$ is a constant selected to weigh the content item score. The multiplier $\alpha_2$ is a function of the content item score, and weighs the external page score based on the content item quality score. In one embodiment, the function associated with the multiplier $\alpha_2$ is a mathematical function that increases the weight of the external page quality score as the content item quality score increases. Thus, a content item with a low quality score would result in a lower value of $\alpha_2$ and subsequently lower subsidy or penalty, while a content item with a high quality score would result in a higher value of $\alpha_2$ and a greater subsidy or penalty during the selection process.

Figure 3:
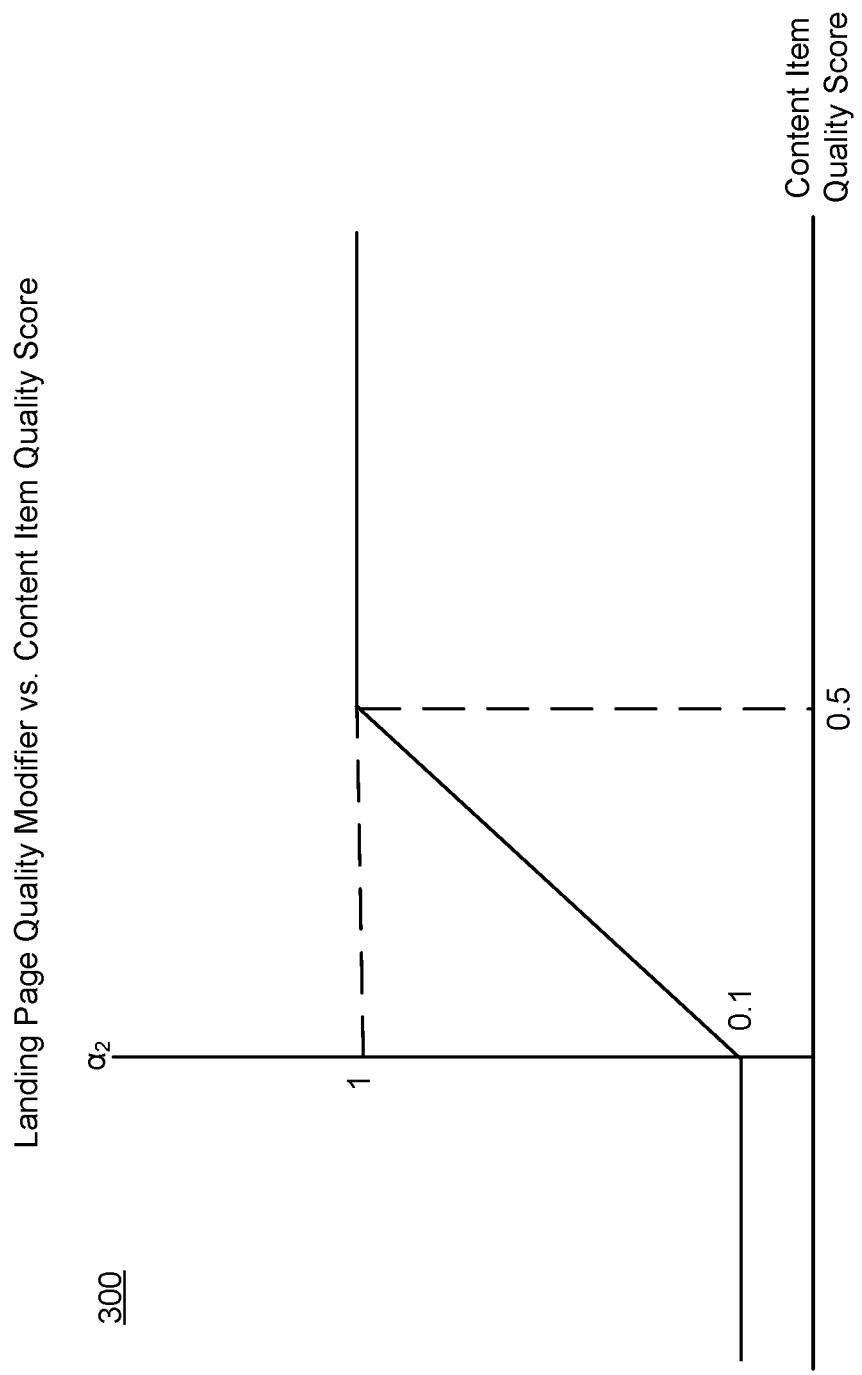
FIG. 3 is an example illustrating a function to relate the quality score of a post to the adjustment for a quality score of an external page, in accordance with an embodiment.

FIG. 3 is an example illustrating a function 300 used to relate the quality score of a post on the online system 120 to the adjustment for a quality score of an external page associated with the post, in accordance with an embodiment. Upon receiving a request for content items to be presented to a user, the system 120 determines a content item quality score and a landing page quality score for a content item containing an external link to a landing page. In one embodiment, the quality score is a numeric value wherein a lower value indicates a low quality score and a higher value indicates a high quality score. As shown in the figure, a function is determined to relate the quality score of the content item to the modifying coefficient $\alpha_2$ of the landing page quality score. A content item quality score of 0, indicating a low quality content item, produces a modifying coefficient of 0.1. As the content item quality score increases, the modifying coefficient increases linearly to a value of 1 at a content item quality score of 0.5. Content item quality scores exceeding 0.5 correspond to a modifying coefficient value of 1. In other embodiments, the function relating the content item quality score and the modifying coefficient $\alpha_2$ may vary in slope, start and end values, and other factors.

The content item quality score, landing page quality score, and modifying coefficients $\alpha_1$ and $\alpha_2$ are then used to generate a bid quality modifier as described in Equation 2. In example, a content item with a quality score of 0.75 produces a modifying coefficient $\alpha_2=1$. Therefore, the bid quality modifier receives the full subsidy or penalty of the landing page quality score. In another example, a content item with a quality score of 0.1 produces a modifying coefficient $\alpha_2=0.28$. The subsidy or penalty of the landing page quality score is therefore scaled by a factor of 0.28 rather than being weighed fully.

Figure 4:
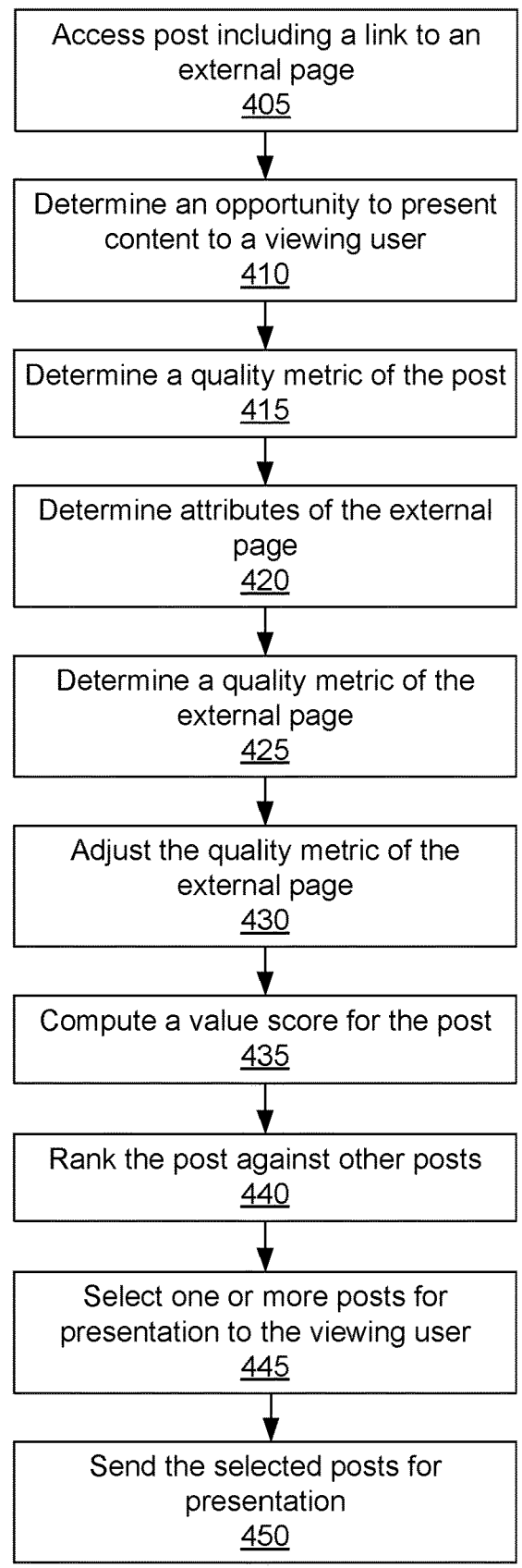
FIG. 4 is a flow diagram of a method for adjusting the quality score of an external page based on the quality of the associated post, in accordance with an embodiment.

FIG. 4 is a flow chart illustrating a method for adjusting the quality scores of external pages based on the quality of associated posts. In various embodiments, the method may include different and/or additional steps and the steps may be performed in different orders than those described in conjunction with FIG. 4.

The system 120 accesses 405 a content item that includes a link to an external landing page. The content item may be an organic post from an individual user or sponsored content from a business or organization. The system 120 determines 410 an opportunity to present content to a viewing user when a viewing user refreshes a page, requests a newsfeed to be generated, or takes another action on the online system 120. To identify content items to present to the viewing user, the online system 120 performs a selection process in which candidate content items, including the accessed content item, are scored based on a likelihood that the viewing user will interact with the content item upon being presented with the content item. The candidate content items may be text posts, videos, photos, advertisements, or others. To determine a score for the accessed content item, the system 120 determines 415 a quality metric of the content item. The quality metric is based off of features of the content item on the online system 120, such as its relevance to the interests of the viewing user, the connection of the viewing user to the poster of the content item, the timestamp, historic interactions, and others.

The system 120 then determines 420 attributes of the external landing page. In one embodiment, attributes of the external landing page include features such as a misleading title, a slow load time, technical glitches, advertisements, not mobile friendly, and others. The system 120 may also determine attributes of the landing page such as the historical dwell time spent by users at the external link, user bounce-back rate, and other historic data of the page or the viewing user. These attributes are used to determine 425 a quality metric of the landing page. Based on the determined quality metric of the content item and as described in FIG. 3, the system 120 then adjusts 430 the quality metric of the external page such that it is weighed with respect to the quality metric of the content item. The adjusted quality metric of the external page and the quality metric of the content item are used to compute 435 a value score for the content item.

Based on the value score of the content item, the system 120 ranks 440 the content item against other content items competing for placement in the selection process. The system 120 then selects 445 one or more content items for presentation to the viewing user. In one embodiment, the online system 120 selects content items based on achieving a threshold content score. In another embodiment, the online system 120 selects content items based on achieving a threshold position in the ranking. The online system 120 sends 450 the selected content items for presentation to the viewing user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing a content item from a posting user of an online system, the content item comprising a link to an external page that is outside the online system;
    determining an opportunity to present content to a viewing user of the online system;
    determining a quality metric of the content item for the viewing user;
    determining one or more attributes of the external page;
    determining a quality metric of the external page, the quality metric of the external page based on the attributes of the external page;
    adjusting the quality metric of the external page based on the quality metric of the content item;
    computing a value score for the content item, the value score based on the quality metric of the content item and the quality metric of the external page;
    ranking the content item by its value score along with a plurality of other content items;
    selecting, based on the ranking, one or more of: the content item and the plurality of other content items; and
    sending the selected content items for presentation to the viewing user.

2. The method of claim 1, wherein the quality metric of the content item is based at least in part on a score generated by a professional rating service.

3. The method of claim 1, wherein the quality metric of the external page is based at least in part on the likelihood of the viewing user viewing the external page for less than a threshold time period.

4. The method of claim 1, wherein the quality metric of the external page is adjusted as a function of the quality metric of the content item.

5. The method of claim 4, wherein the function used to determine the adjustment linearly scales such that a low post quality metric results in a low adjustment multiplier and a high post quality metric results in a high adjustment multiplier.

6. The method of claim 1, wherein the quality metric of the content item is further determined based on attributes associated with the viewing user.

7. The method of claim 1, wherein computing a value score comprises:
    adjusting the quality metric of the content item, the adjustment determined as a constant value independent of the quality metric of the content item; and
    summing the adjusted quality metric of the content item and the adjusted quality metric of the external page to determine the value score for the content item.

8. The method of claim 1, wherein the content item accessed by the online system may comprise: an organic post from an individual user, or sponsored content from a business or organization.

9. The method of claim 1, wherein the external page associated with the accessed content item comprises one or more of: a web page, a mobile application, and a state or page within a mobile application defined by a deep link.

10. A non-transitory computer-readable storage medium storing computer program instructions executable by a processor to perform operations comprising:
    accessing a content item from a posting user of an online system, the content item comprising a link to an external page that is outside the online system;
    determining an opportunity to present content to a viewing user of the online system;
    determining a quality metric of the content item for the viewing user;
    determining one or more attributes of the external page;
    determining a quality metric of the external page, the quality metric of the external page based on the attributes of the external page;
    adjusting the quality metric of the external page based on the quality metric of the content item;
    computing a value score for the content item, the value score based on the quality metric of the content item and the quality metric of the external page;
    ranking the content item by its value score along with a plurality of other content items;
    selecting, based on the ranking, one or more of: the content item and the plurality of other content items; and
    sending the selected content items for presentation to the viewing user.

11. The computer-readable storage medium of claim 10, wherein the quality metric of the content item is based at least in part on a score generated by a professional rating service.

12. The computer-readable storage medium of claim 10, wherein the quality metric of the external page is based at least in part on the likelihood of the viewing user viewing the external page for less than a threshold time period.

13. The computer-readable storage medium of claim 10, wherein the quality metric of the external page is adjusted as a function of the quality metric of the content item.

14. The computer-readable storage medium of claim 13, wherein the function used to determine the adjustment linearly scales such that a low post quality metric results in a low adjustment multiplier and a high post quality metric results in a high adjustment multiplier.

15. The computer-readable storage medium of claim 10, wherein the quality metric of the content item is further determined based on attributes associated with the viewing user.

16. The computer-readable storage medium of claim 10, wherein computing a value score comprises:
adjusting the quality metric of the content item, the adjustment determined as a constant value independent of the quality metric of the content item; and
summing the adjusted quality metric of the content item and the adjusted quality metric of the external page to determine the value score for the content item.

17. The computer-readable storage medium of claim 10, wherein the content item accessed by the online system may comprise: an organic post from an individual user, or sponsored content from a business or organization.

18. The computer-readable storage medium of claim 10, wherein the external page associated with the accessed content item comprises one or more of: a web page, a mobile application, and a state or page within a mobile application defined by a deep link, presentation when it goes over two lines.

* * * * *

UNITED STATES PATENT AND TRADEMARK OFFICE
CERTIFICATE OF CORRECTION

PATENT NO. : 10,896,239 B1
APPLICATION NO. : 15/910001
DATED : January 19, 2021
INVENTOR(S) : Kim et al.

Page 1 of 1

It is certified that error appears in the above-identified patent and that said Letters Patent is hereby corrected as shown below:

In the Claims

In Column 15, in Claim 18, Lines 31-32, delete "link, presentation when it goes over two lines." and insert -- link. --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*